United States Patent
Akiyama et al.

(10) Patent No.: US 7,782,406 B2
(45) Date of Patent: Aug. 24, 2010

(54) RECEIVING APPARATUS AND RECEIVING METHOD FOR CHANNEL SWITCHING IN BOTH DIGITAL AND ANALOG TV RECEPTION

(75) Inventors: Hitoshi Akiyama, Yokohama (JP); Takatoshi Shirosugi, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 1205 days.

(21) Appl. No.: 11/368,696

(22) Filed: Mar. 7, 2006

(65) Prior Publication Data

US 2006/0291441 A1 Dec. 28, 2006

(30) Foreign Application Priority Data

Jun. 23, 2005 (JP) .............................. 2005-182772

(51) Int. Cl.
*H04N 5/50* (2006.01)
(52) U.S. Cl. ...................................................... 348/731
(58) Field of Classification Search ................ 348/731, 348/732, 705, 706, 725–728
See application file for complete search history.

(56) References Cited

U.S. PATENT DOCUMENTS

| 6,334,217 B1 * | 12/2001 | Kim ............................. 725/38 |
| 6,714,265 B2 * | 3/2004 | Chino et al. .................... 349/2 |
| 6,766,526 B1 * | 7/2004 | Ellis ............................. 725/57 |
| 6,788,319 B2 * | 9/2004 | Matsumoto et al. ......... 715/841 |
| 7,268,833 B2 * | 9/2007 | Park et al. .................... 348/588 |
| 2002/0047866 A1 * | 4/2002 | Matsumoto et al. ......... 345/810 |
| 2004/0181813 A1 * | 9/2004 | Ota et al. ..................... 725/131 |
| 2004/0189879 A1 * | 9/2004 | Read ........................... 348/731 |
| 2006/0152629 A1 * | 7/2006 | Hirotani et al. ............. 348/565 |

FOREIGN PATENT DOCUMENTS

| JP | 06-038117 | 2/1994 |
| JP | 09-135394 | 5/1997 |
| JP | 2003-116073 | 4/2003 |
| JP | 2005-094451 | 4/2005 |

\* cited by examiner

*Primary Examiner*—Paulos M Natnael
(74) *Attorney, Agent, or Firm*—Antonelli, Terry, Stout & Kraus, LLP.

(57) ABSTRACT

In a digital broadcasting receiving apparatus, channel selection that switches a physical channel requires a longer period of time than analog. To solve the above problem, for example, there are provided two systems each including a digital tuner and a decoder, wherein channel selection and decoding are carried out by a second tuner and decoder respectively, when the user carries out the channel selection operation. During this time, the first system continues decoding. At the moment when the user carries out the channel selection operation, the luminance is decreased to some extent to allow the user to intuitively know that the channel selection operation is started, and then the luminance is further decreased gradually. When the luminance reaches zero, the decoding is started in the second system, and then the system to display is switched.

7 Claims, 5 Drawing Sheets

RECEIVING APPARATUS AND RECEIVING METHOD FOR CHANNEL SWITCHING IN BOTH DIGITAL AND ANALOG TV RECEPTION

CLAIM OF PRIORITY

The present application claims priority from Japanese patent application No. JP2005-182772 filed on Jun. 23, 2005, the content of which is hereby incorporated by reference into this application.

BACKGROUND OF THE INVENTION

The present invention relates to a channel switching and image display in digital and analog television broadcasting receiving apparatuses.

In the digital broadcasting receiving apparatus, there has been a disadvantage that it takes a long time until the image display after switching is started in the channel switching.

As an improvement measure for the disadvantage, there is a method, as disclosed in Patent Reference 1, for reducing the psychological burden of the user by using a display method that keeps the image before the channel switching as a static image, and gradually enlarges the moving image after the channel switching.

As another improvement measure, there has been conceived a display method, as disclosed in Patent Reference 2, for weighting and synthesizing the moving images of before and after the channel switching.

Further, disclosed in Patent Reference 3 is a technology for carrying out a fade-out process (luminance change over time) of the final static image corresponding to the channel before switching, during the period of time from the start of the channel switching to the completion of the channel switching.

[Patent Reference 1] JP-A No. Hei 9-135394
[Patent Reference 2] JP-A No. Hei 6-38117
[Patent Reference 3] JP-A No. 2005-94451

SUMMARY OF THE INVENTION

However, with the above-described method disclosed in Patent Reference 1, the period of time until the image after the channel switching can be displayed is not changed. Thus, the static image before the channel switching is only displayed during the period until the moving image after the channel switching is displayed in a small size, and then the moving image gradually becomes large, so that there has been a problem that the time required until the channel switching is perfectly completed becomes longer.

Further, with the above-described method disclosed in Patent Reference 2, the period of time until the image after the channel switching can be displayed is not changed, and the moving image is weighted and synthesized only when the decoding process after the channel switching is started, so that the time required until the channel switching is perfectly completed becomes longer. Since the time required for the channel switching is long, there is also a problem that the user wrongly recognizes that the channel switching instruction of the user is not received by the receiving apparatus, and thereby issues the channel switching instruction many times.

Further, the above described Patent Reference 3 only discusses the change in the luminance of the static image, and it is difficult to say that the study is sufficiently done on reducing the psychological burden and uncomfortable feeling that the user has in the channel switching.

In order to solve the above problems, the present invention assumes a configuration that provides plural tuners and that switches the tuner itself in the channel switching. For example, assuming the case where there are two tuners 1 and 2 and a user carries out an instruction to switch to Channel 10 when viewing on Channel 8 with the tuner 1, the configuration is made so that the user continues viewing on Channel 8 (the channel before switching) with the tuner 1 during the period until Channel 10 becomes viewable with the tuner 2.

In other words, for example, as described in claim 1, it may be configured to include: first and second receiving sections for receiving broadcasting signals, first and second channel selection sections for selecting channels of the broadcasting signals received by the first and second receiving sections; first and second demodulation sections for demodulating the broadcasting signals that are channel-selected by the first and second channel selection sections; first and second demultiplex sections for demultiplexing the broadcasting signals demodulated by the first and second demodulation sections; first and second decode sections for decoding the broadcasting signals demultiplexed by the first and second demultiplex sections; a channel selection instruction section for carrying out an instruction of the channel selection of the broadcasting signals; and a control section, when an instruction to switch the channel is given in the channel selection instruction section, for controlling to output an image signal of a channel to be switched using the second channel selection section, the second demodulation section and the second decode section while at the same time outputting an image signal of a channel before being switched using the first channel selection section, the first demodulation section and the first decode section.

With the configuration as described above, the user can wait during the switching time while viewing the moving image before the channel switching, so that the user can significantly reduce uncomfortable feeling, psychological burden and anxiousness and the like in the channel switching.

According to the present invention, a receiving apparatus and receiving method for reducing the psychological burden of the user can be provided.

DETAILED DESCRIPTION OF THE PREFERRED EMBODIMENTS

Figure 1:
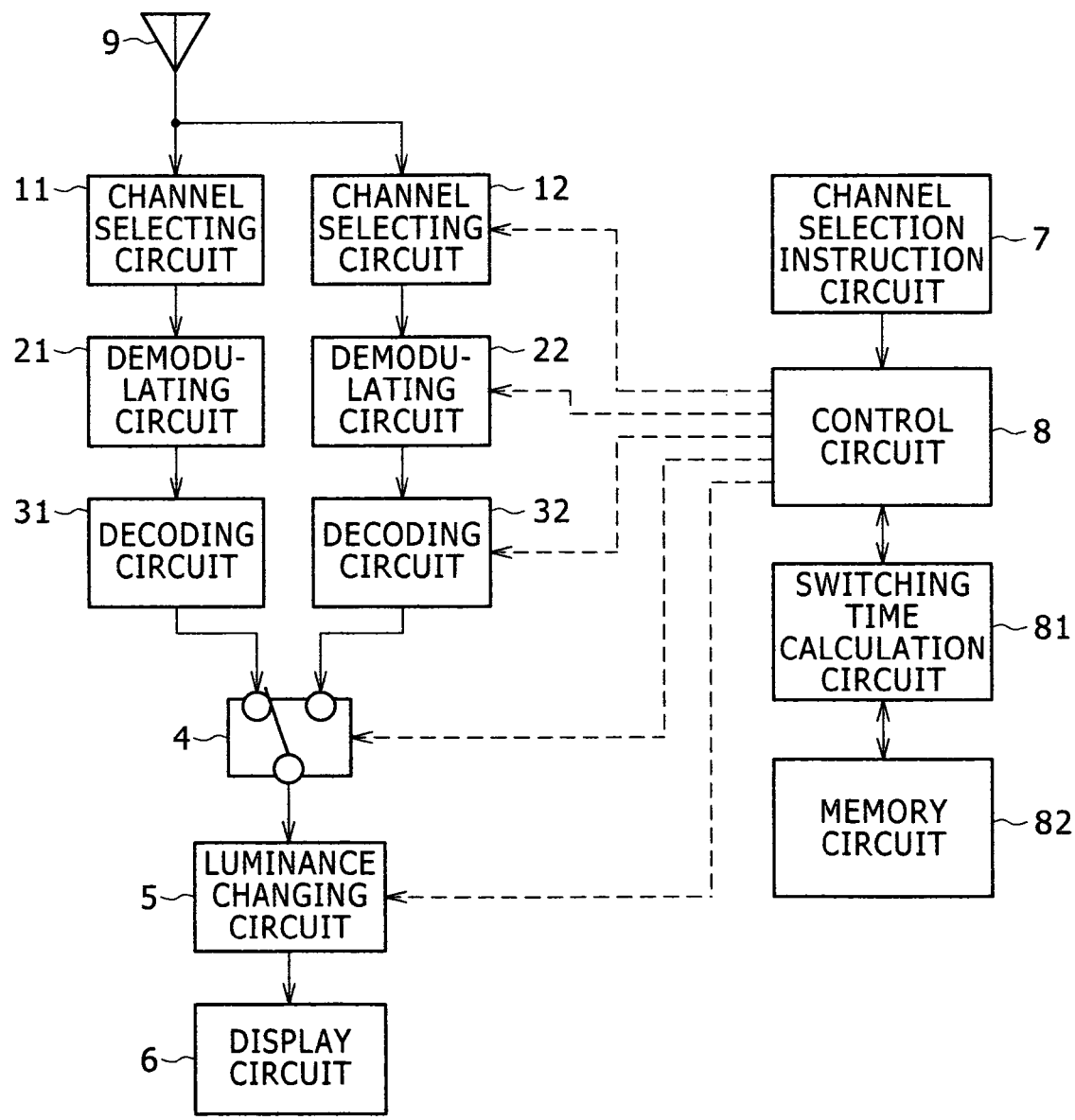
FIG. 1 is a block diagram showing an overview of a receiving apparatus (Embodiment 1)

Hereinafter, the embodiments of the present invention will be described in detail with reference to the accompanying drawings. It is to be noted that the same reference numerals represent the same or corresponding parts in the figures.

Embodiment 1

FIG. 1 is a block diagram showing an overview of a television receiving apparatus according to Embodiment 1 of the present invention. In FIG. 1, reference numeral 9 denotes a receiving antenna, reference numerals 11 and 12 denote channel selecting circuits, reference numerals 21 and 22 denote demodulating circuits, reference numerals 31 and 32 denote decoding circuits, reference numeral 4 denotes an image signal selecting circuit, reference numeral 5 denotes an image signal luminance changing circuit, reference numeral 6 denotes an image signal display circuit, reference numeral 7 denotes a channel selection instruction circuit for receiving a channel switching command from a user, reference numeral 81 denotes a channel switching time calculation circuit for calculating the channel switching time, and reference numeral 82 denotes a memory circuit for storing the channel switching time.

A description will be made on the operation for carrying out the channel switching in the receiving apparatus shown in FIG. 1. First, it is assumed that the user has already been receiving a broadcasting signal of a channel and displayed the image signal before issuing a channel switching command. At this time, a certain channel is selected in the channel selecting circuit 11 and a received signal of the selected channel is output. In the demodulating circuit 21, the demodulation process in accordance with the transmission system is carried out and a digital stream such as MPEG is output. In the decoding circuit 31, the decoding process of the digital stream is carried out.

More specifically, the streams such as the image, sound, and data that are compressed and multiplexed in a digital stream to be broadcasted are demultiplexed from each other and each stream is extended, thereby the image and sound signal of the base band is output. The output image signal is displayed by the display circuit 6 through the selecting circuit 4 and the luminance changing circuit 5. In the normal receiving state, the luminance changing circuit 5 does not change the luminance of the image signal. Incidentally, although partially omitted in FIG. 1, the control circuit 8 controls the operations of the channel selecting circuits 11 and 12, the demodulating circuits 21 and 22, decoding circuits 31 and 32, selecting circuit 4 and luminance changing circuit 5, respectively.

Next, a description will be made on the operation when the user carries out the channel switch operation. The channel selection instruction circuit 7 receives the channel switching command from the user, and the control circuit 8 instructs the receiving system that is different from the receiving system currently receiving, to receive the new channel. In other words, the control circuit 8 issues an instruction to the channel selecting circuit 12 to receive the new channel, and instructs the demodulating circuit 22 to carry out the demodulation process in accordance with the transmission system of the new channel. Further, the control circuit 8 instructs the decoding circuit 32 to decode the new channel.

The conventional receiving apparatus not carrying out the luminance change of the image signal has been designed to select the image signal of the new channel in the selecting circuit 4, along with issuing the instruction to the channel selecting circuit 12, the demodulating circuit 22, and the decoding circuit 32. With such control, a certain period of time is required until the image signal of the new channel is actually displayed in the display circuit 6. In other words, there needs to add the time required to select a channel in the channel selecting circuit 21, the time required to output the digital stream after carrying out the demodulation process in the demodulating circuit 22, and the time required to output the first image frame after carrying out the demultiplexing process of the digital stream and the extension process of the demultiplexed stream in the decoding circuit 32. Generally, the time required for the channel selection passes fast enough to be hardly troublesome for the user. However, the demodulation process time and the decoding process time are often at a level that is not negligible.

Particularly in the digital television broadcasting, the required demodulation process time is likely to be long. For example, in the terrestrial digital broadcasting, the time fluctuation of the transmission route such as fading is expected, so that a method of replacing the data array which is referred to as interleave is sometimes used in the modulation side. Carrying out such a process requires a de-interleave process that returns to the original data array as the demodulation process of the receiving apparatus. The longer the unit time to do interleave takes, the stronger it is against the time fluctuation of the transmission route. Meanwhile, at least the unit time of interleave is required in order to output the data stream of the original array in the demodulating circuit of the receiving apparatus. Further, in the decoding process, it is required to buffer the data to some extent in order to generate an image signal of one frame from the data stream, and thereby the data stream can not immediately output as the image signal.

For the reasons as described above, when the image signal of the new channel is selected in the selecting circuit 4, a certain period of time is required until the image is actually displayed in the display circuit 6. During this time, no display is made on the screen, so that the psychological burden of the user is heavy.

Figure 2:
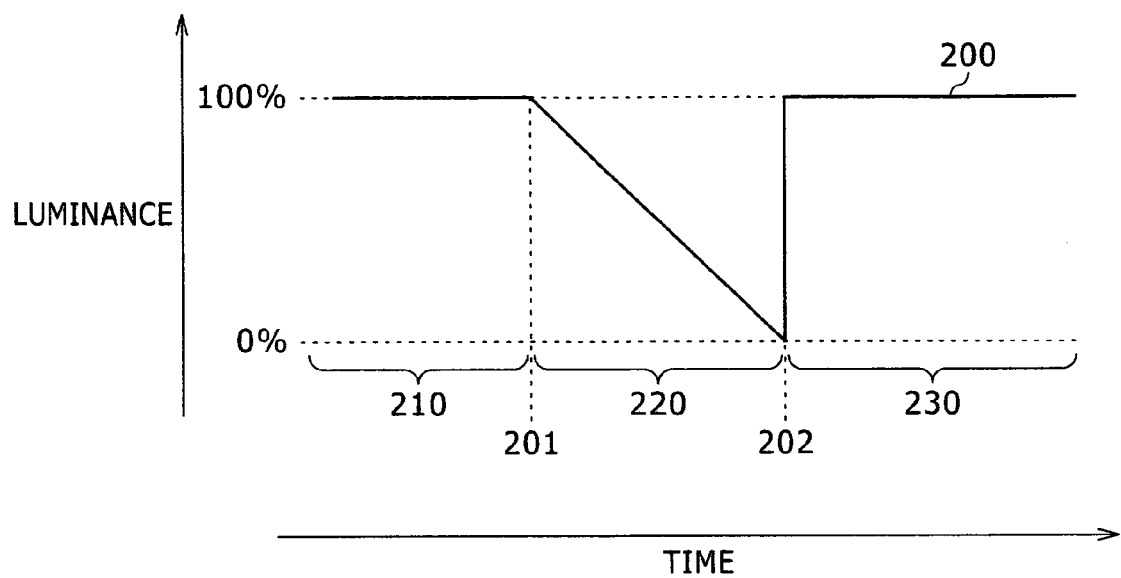
FIG. 2 is an illustration showing an implementation method of the receiving apparatus (Embodiment 1)

The receiving apparatus according to the present embodiment does not immediately switch the image signal in the selecting circuit 4 but carries out the luminance change process of the image signal in the luminance changing circuit 5. The method of this process will be described using FIG. 2. In FIG. 2, the horizontal axis represents time, the vertical axis represents the luminance ratio of the image signal that the luminance changing circuit 5 outputs, and the actual output signal is represented by reference numeral 200. The luminance of the image signal varies depending on the contents of the image to be displayed. FIG. 2 shows the output level of the luminance changing circuit 5 in the case where the decoding circuits 31 and 32 output the maximum luminance screen of 100% white. First, the receiving system having been receiving continues the same process even after the control circuit issues an instruction to receive the new channel to the channel selecting circuit 12, the demodulating circuit 22, and the decoding circuit 32. In other words, the channel selecting circuit 11, the demodulating circuit 21 and the decoding circuit 31 carry out the same processes as they have been doing, while the decoding circuit 22 keeps outputting the image signal. Also, the selecting circuit 4 keeps selecting the image signal of the decoding circuit 31, and the luminance changing circuit 5 does not carry out the luminance change. Reference numeral 210 of FIG. 2 shows the state before the user carries out the channel switch operation, in which the image before the channel switching is output without the luminance decrease, and displayed in the display circuit 6.

Next, assuming the user issues a channel switching command at timing 201. At this time, the control circuit 8 instructs the channel selecting circuit 12, the demodulating circuit 22 and the decoding circuit 32 to receive the new channel. Meanwhile, the selecting circuit 4 keeps selecting the image signal of the decoding circuit 31 and outputting the image signal to the luminance changing circuit 5. The luminance changing circuit 5 gradually decreases the luminance of the input image signal.

Herein, reference numeral 220 denotes time required for the channel switching. During the period of the time 220, the luminance changing circuit 5 changes the luminance in such a manner that the luminance gradually decreases to become 0% at timing 202. The channel selecting circuit 11, the demodulating circuit 21 and the decoding circuit 31 carry out the same processes as they have been doing, thereby the moving image remains displayed during the period of the time 220. Then, the received image of the switched new channel is output from the decoding circuit 32 at the timing 202, and the selecting circuit 4 switches to the image signal from the decoding circuit 32. At the same time, the luminance changing circuit 5 returns to the state where the luminance is not decreased. With this operation, the image of the switched new channel is displayed in the display circuit 6 during a period 230.

By carrying out the luminance change process as described above, when the user instructs the channel switching command, the luminance of the moving image of the channel before switching gradually decreases, and at the point of time when the luminance is 0%, or the screen is blacked out, the moving image of the switched new channel is displayed thereon. Such a smooth channel switching process makes it possible to reduce the psychological burden of the user without needlessly bothering the user with the length of the channel switching time that is particular to the digital broadcasting.

Embodiment 2

Figure 3:
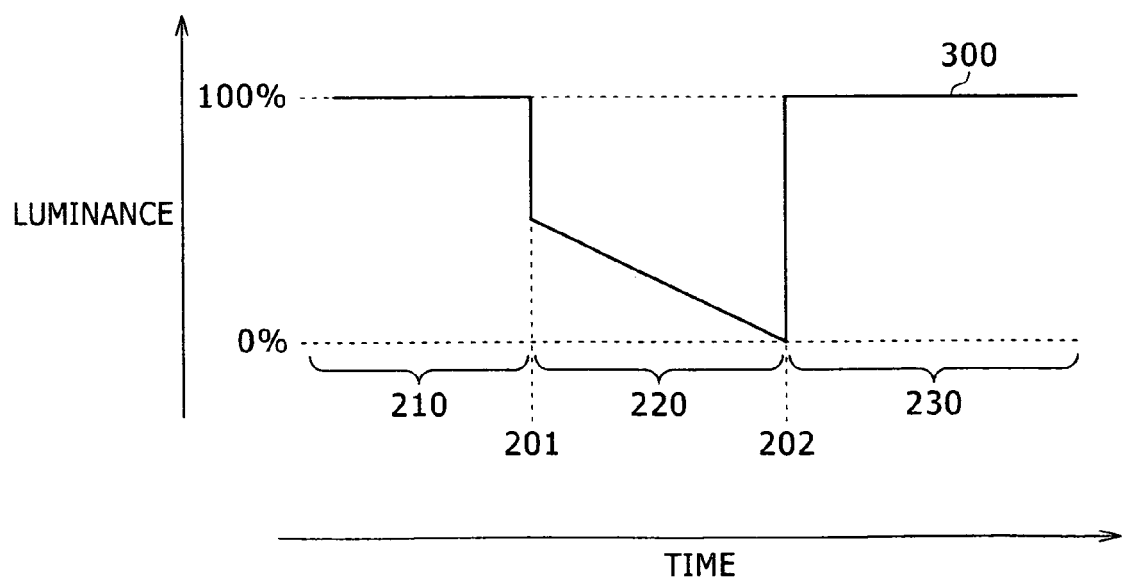
FIG. 3 is an illustration showing another implementation method of the receiving apparatus (Embodiment 2)

Next, an embodiment for carrying out another luminance change process will be described using FIG. 3. In FIG. 3, similarly to FIG. 2, the horizontal axis represents time, the vertical axis represents the luminance ratio of the image signal that the luminance changing circuit 5 outputs, and the actual output image signal is represented by reference numeral 300.

In FIG. 3, the luminance changing circuit 5 substantially decreases the luminance to 50% at the timing 201 when the user instructs the channel switch operation. From this state, the luminance changing circuit 5 changes the luminance in such a manner that the luminance gradually decreases to become 0% at the timing 202. Incidentally, the decreasing ratio of the luminance is not necessarily 50%, and any decreasing ratio in which the user can recognize that the state 210 is changed at the timing 201 may be used.

Further, similarly to FIG. 2, the moving image remains displayed during the period 220, as the selecting circuit 11, the demodulating circuit 21 and the decoding circuit 31 carry out the same processes as they have been doing. Then, the received image of the switched new channel begins to be output from the decoding circuit 32 at the timing 202, and the selecting circuit 4 switches to the image signal from the decoding circuit 32. At the same time, the luminance changing circuit 5 returns to the state where the luminance is not decreased. With this operation, the image of the switched new channel is displayed in the display circuit 6 during the period 230.

By carrying out the luminance change process as described above, the luminance decreases at the moment when the user instructs the channel switching command, so that the user can intuitively know that the channel switching command is received by the receiving apparatus. Thus, the user does not wrongly recognize that the channel switching command is not received by the receiving apparatus. Further, similarly to Embodiment 1, the luminance of the moving image of the channel before switching gradually decreases from the timing 201, and when the luminance is 0%, or the screen is blacked out, the moving image of the switched new channel is displayed thereon. Such a smooth channel switching process makes it possible to reduce the psychological burden of the user without needlessly bothering the user with the length of the channel switching time that is particular to the digital broadcasting.

Embodiment 3

Figure 4:
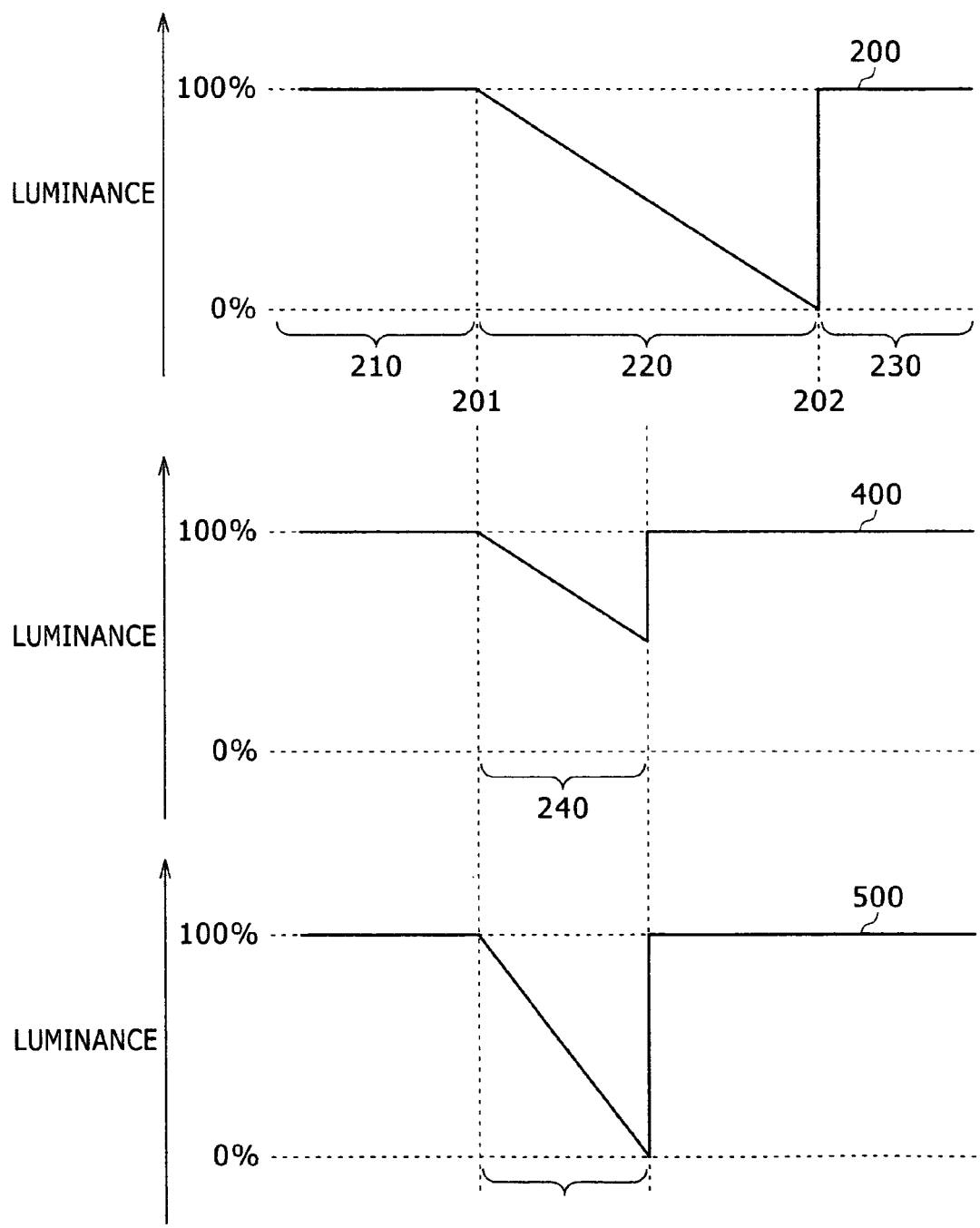
FIG. 4 is an illustration showing still another implementation method of the receiving apparatus (Embodiment 3)

Next, another embodiment will be described using FIGS. 1 and 4. In FIG. 4, similarly to FIG. 2, the horizontal axis represents time, and the vertical axis represents the luminance ratio of the image signal that the luminance changing circuit 5 outputs. Reference numeral 200 denotes the image signal output of the luminance changing circuit 5 which is the same as FIG. 2, and reference numeral 400 denotes the image signal output of the luminance changing circuit 5 in the case where the channel switching time is short.

The channel switching time until the image signal of the new channel is output in the channel selecting circuit 12, the demodulating circuit 22 and the decoding circuit 32 may vary due to different transmission media to be received or different transmission parameters set in the transmission side. Reference numeral 240 of FIG. 4 shows the case where the channel switching time is a half of 220. When the luminance changing circuit 5 carries out the same luminance change process, the image signal of the switched channel begins to be output from the decoding circuit 32 at timing 205. Thereby, when the selecting circuit 4 is switched at the timing 205, the channel is switched to the new channel before the luminance decreases to 0% as shown in 400, so that a difference can be seen in the process in the channel switching.

Thus, by previously storing the time required until the image signal of the switched channel is output to control the speed of the luminance decrease in accordance with the stored time, it is possible to switch to the new channel when the luminance is 0%, with any channel switching being carried out.

A way to carry out such a process is to previously calculate the channel switching time for each channel in the channel switching time calculation circuit 81, and to store the time in memory circuit 82. A way to actually switch the channel, for example, is to read the value of the channel switching time 240 from the memory circuit 82, and as shown in 500 of FIG. 4, to control the luminance changing circuit 5 so that the luminance is 0% at the timing 205.

By carrying out the luminance change process as described above, although the channel switching time varies due to the difference of the transmission media or transmission parameters, the luminance of the moving image of the channel before switching gradually decreases from the timing 201, and when the luminance is 0%, or the screen is blacked out, the moving image of the switched new channel is displayed thereon. Such a smooth channel switching process makes it possible to reduce the psychological burden of the user without needlessly bothering the user with the length of the channel switching time that is particular to the digital broadcasting.

Embodiment 4

Figure 5:
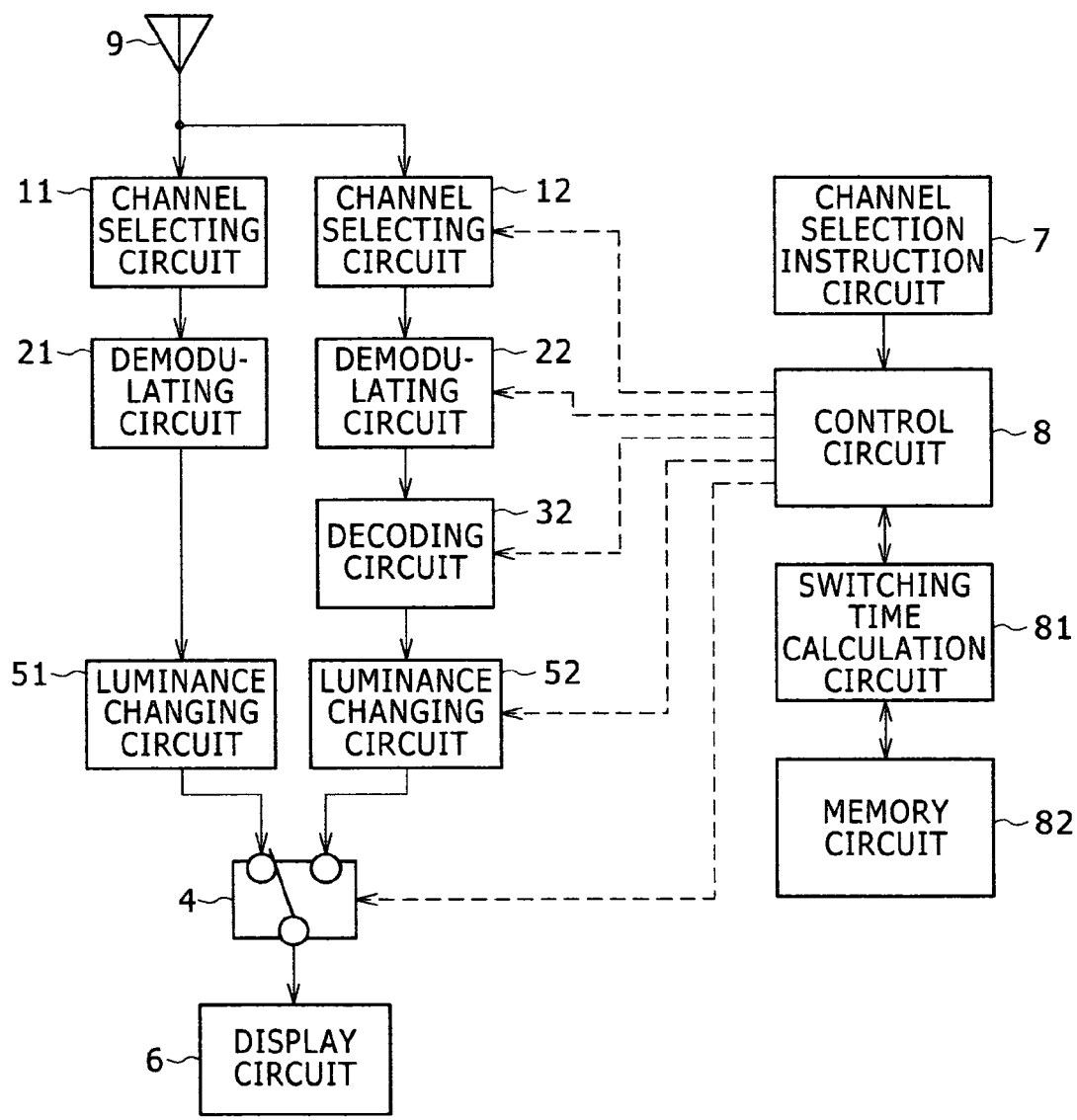
FIG. 5 is a block diagram showing another overview of the receiving apparatus (Embodiment 4)

Next, another embodiment will be described using FIG. 5. In FIG. 5, reference numeral 51 denotes a first luminance changing circuit, and reference numeral 52 denotes a second luminance changing circuit.

Having described in the embodiment shown in FIG. 1 on the case where the luminance change process is applied to the selected image signal, but the same advantage can be achieved by carrying out the luminance change process in each of the receiving systems independently and selecting the image signal to which the luminance change process has been applied.

Further, this embodiment can be implemented even with the receiving system supporting the analog television broadcasting system. FIG. 5 shows the configuration of the case where the receiving system using a selecting circuit 11 supports the analog broadcasting system, in which the demodulating circuit 21 is the analog system and its output, which is the image signal, is directly input to the luminance changing circuit 51 without requiring the decoding circuit.

Embodiment 5

Next, still another embodiment will be described using FIG. 6. In the above-described embodiments, there exist the two receiving systems formed by the selecting circuits, the demodulating circuits and the decoding circuits, respectively. On the other hand, the similar advantage can be achieved with one receiving system as shown in FIG. 6.

Figure 6:
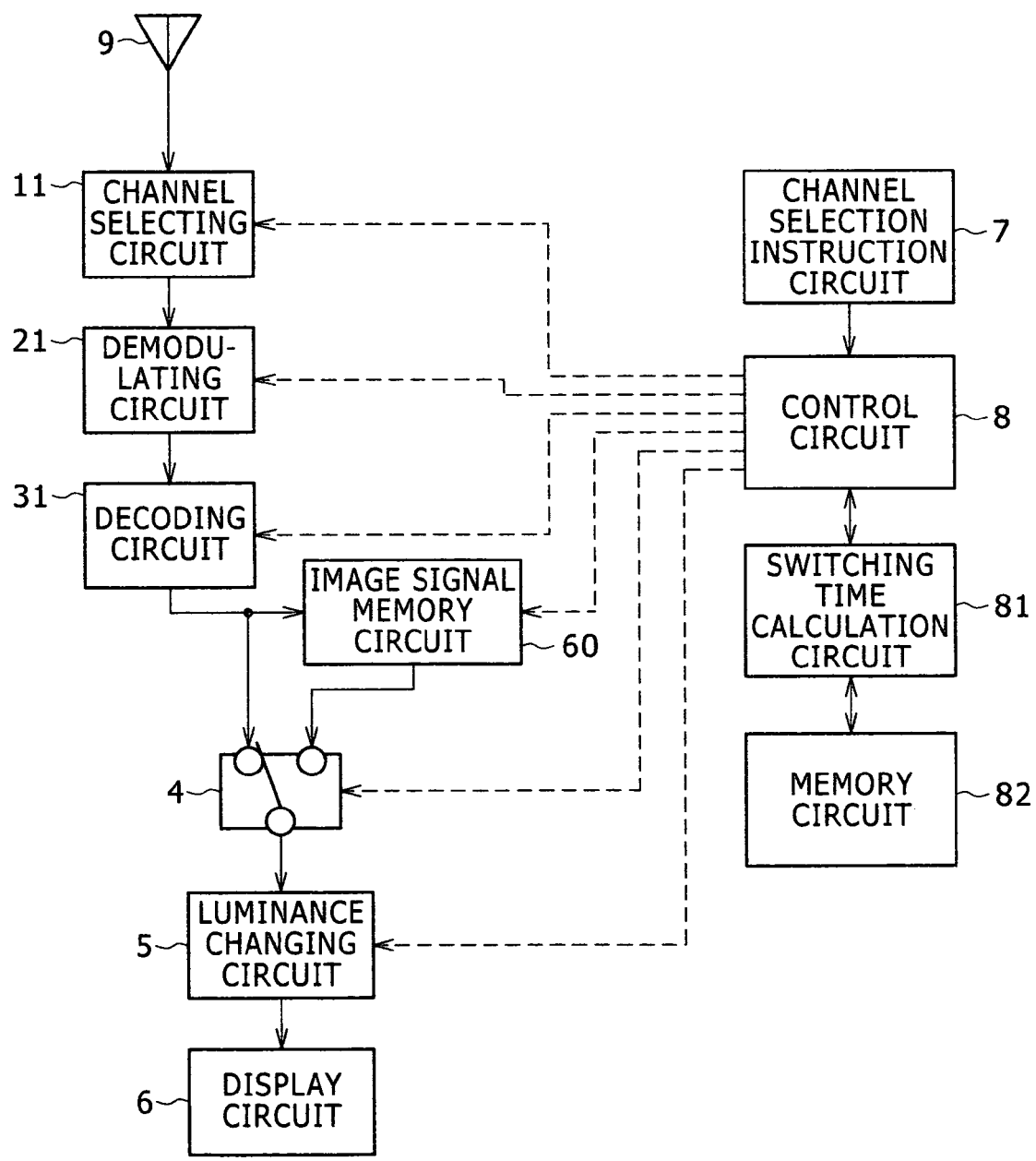
FIG. 6 is a block diagram showing still another overview of the receiving apparatus (Embodiment 5).

In FIG. 6, reference numeral 60 denotes an image signal memory circuit for storing the image signal output from the decoding circuit 31. When the channel selection instruction circuit 7 receives the channel switch operation command from the user, the control circuit 8 stores the last frame of the image signal output from the decoding circuit 31 in the image signal memory circuit 60 and instructs to output the stored image signal in series. At the same time, the control circuit 8 issues an instruction to the selecting circuit 11 to receive the new channel, and instructs the demodulating circuit 21 to carry out the demodulation process in accordance with the transmission system of the new channel. Further, the control circuit 8 instructs the decoding circuit 31 to decode the new channel. Meanwhile, the selecting circuit 4 switches so as to select the image signal in the image signal memory circuit 60 and outputs the image signal to the luminance changing circuit 5. The luminance changing circuit 5 gradually decreases the luminance of the input image signal. After the channel switching process has been completed and when the image signal becomes ready to be output from the decoding circuit 31, the selecting circuit 4 switches to the image signal from the decoding circuit 31. At the same time, the luminance changing circuit 5 returns to the state where the luminance is not decreased. With this operation, the image of the switched channel is displayed in the display circuit 6.

By carrying out the luminance change process as described above, even with the single receiving system, the luminance of the static image of the channel before switching gradually decreases, and when the luminance is 0%, or the screen is blacked out, the moving image of the switched new channel is displayed thereon. Such a smooth channel switching process makes it possible to reduce the psychological burden of the user without needlessly bothering the user with the length of the channel switching time that is particular to the digital broadcasting.

Incidentally, the above-described embodiment is configured to carry out the luminance change process of the image signal without immediately switching the image signal in the channel switching, but the present invention is not limited to this embodiment.

For example, it may be configured to reduce only the sound signal (sound change) rather than changing the luminance, or to cause the moving image, which is being displayed on the channel before switching, to be displayed with the previously stored character information incorporated therein (moving image change). In addition, with the configuration in which the luminance change, the sound change and the moving image change are combined together, further reduction of the psychological burden of the user can be expected.

Further, having assumed in the present embodiment that there are two receiving systems (tuners and selection sections), the present invention is not limited to this configuration, and there may be three receiving systems. When plural tuners are mounted, the use of these tuners by the user is more complicated. For example, assuming that there are three tuners and that the user is viewing a program on Channel 6 with a tuner 1, recoding a program on Channel 10 with a tuner 2, while not using a tuner 3. When the present invention is applied to the above case, the user can wait during the switching time while viewing the moving image before the channel switching using the unused tuner 3, so that it is possible to substantially reduce the uncomfortable feeling, psychological burden and anxiousness in the channel switching.

What is claimed is:

1. A receiving apparatus comprising:

first and second channel selection sections for selecting channels of broadcasting signals;

first and second demodulation sections for demodulating the broadcasting signals that are channel-selected by the first and second channel selection sections;

first and second decode sections for decoding the broadcasting signals demodulated by the first and second demodulation sections;

a channel selection instruction section for carrying out an instruction of the channel selection of the broadcasting signal;

a control section, that when an instruction to switch to one channel from another channel is given in the channel selection instruction section, controls an output of an image signal of the one channel to be switched to, using the second channel selection section, the second demodulation section and the second decode section while at the same time outputting an image signal of the another channel before being switched, using the first channel selection section, the first demodulation section and the first decode section; and a luminance change section, for changing the luminance of the image signals included in the broadcasting signals decoded by the first decode section and the second decode section;

wherein the luminance change section changes the luminance of the image signal of the another channel before being switched, when the instruction to switch to the one channel from the another channel is given in the channel selection instruction section.

2. The receiving apparatus according to claim 1, further comprising a selection section for selecting the broadcasting signals decoded by the first decode section and second decode section, wherein the selection section selects the image signal from the first decode section until the image signal is output from the second decode section.

3. The receiving apparatus according to claim 1, wherein the luminance change section changes the luminance of the image signal so that the luminance is gradually decreased.

4. A receiving apparatus comprising:

first and second channel selection sections for selecting channels of broadcasting signals;

first and second demodulation sections for demodulating the broadcasting signals that are channel-selected by the first and second channel selection sections;

first and second decode sections for applying a decoding process to the signals demodulated by the first and second demodulation sections;

a selection section for selecting the image signals output from the first and second decode sections;

a luminance change section for changing the luminance of the image signal;

a channel selection instruction section for carrying out an instruction to switch the channel; and a control section for providing overall control;

wherein when the instruction to switch from a first channel to a second channel is given in the channel selection instruction section, the control section instructs to output an image signal of the second channel using the second channel selection section, the second demodulation section and the second decode section, while at the same time outputting an image signal of the first channel using the first channel selection section, the first demodulation section and the first decode section;

wherein the selection section selects the image signal from the first decode section until the image signal is output from the second decode section;

wherein the luminance change section changes the luminance of the image signal from the first decode section when receiving the channel switch instruction from the channel selection instruction section; and wherein the luminance change section stops the luminance change when the output of the image signal is started from the second decode section.

5. The receiving apparatus according to claim 2, further comprising selecting the channel by the selection section rather than through the first decode section or second decode section, when the selected channel is analog broadcasting.

6. The receiving apparatus according to claim 3, wherein the luminance change section gradually decreases the luminance when receiving a channel selection instruction.

7. The receiving apparatus according to claim 3, further comprising a storing section for storing, for each channel, channel switch process time required from when the channel switch instruction is given to when the image signal is output, wherein the control section controls the speed of the luminance change in accordance with the channel switch process time stored in the storing section.

* * * * *